United States Patent Office 2,820,776
Patented Jan. 21, 1958

2,820,776

CROSS-LINKING OF FLUORINE-CONTAINING ELASTOMERS

Lester E. Robb, Westfield, and Martin E. Conroy, Sea Girt, N. J., assignors, by mesne assignments, to Minnesota Mining and Manufacturing Company, St. Paul, Minn., a corporation of Delaware No Drawing. Application March 21, 1955
Serial No. 495,768

16 Claims. (Cl. 260—87.7)

This invention relates to the cross-linking of polymers and, more particularly, to the modification of the characteristics of chain saturated polymers whose structure is composed substantially exclusively of carbon, hydrogen and halogen atoms.

Chain polymers are thermoplastic in nature. They exhibit continuous flow under the influence of heat and pressure. Such polymers can be resoftened as often as desired and are usually soluble in selected solvents.

Cross-linked or space polymers, on the other hand, are generally thermosetting, that is to say that they cannot be softened without decomposition once they have hardened, and that they are insoluble in all solvents. A chain polymer may, however, contain a small number of cross-linkages without completely losing its thermoplastic properties.

It is often desirable to convert chain to space polymers. This is done when it is desired to decrease solubility and thermoplastic flow and, in the case of chain elastomers, where it is desired to obtain a harder, tougher product. The cross-linking of elastomers is commonly referred to as vulcanization.

Vulcanized or cross-linked elastomers may have equal, greater or lesser extensibility than the linear elastomers, depending on the number and nature of the cross-linkages. In any case, they have lessened plasticity and solubility and increased toughness and heat resistance.

The nature of the cross-linking agent will vary with the nature of the chain polymer and with the nature of the cross-link desired. There are a number of reactions which may result in the cross-linking of a chain polymer. In some reactions the cross-linking agent will take part so that at least a portion of it forms the cross-link and appears in the final cross-linked molecule. In other reactions the cross-linking agent acts solely as an activator and does not appear in the final molecule.

The chemistry of cross-linking is imperfectly understood. Cross-linking agents successful with one type of chain polymer are often ineffective with another type. There appears to be no rule for predicting with accuracy whether or not a particular cross-linking agent effective with one type of chain polymer will be effective with another type. In fact, the term "cross-linking agent," itself, covers materials which are chemically and physically dissimilar and have in common the sole characteristic that each is effective for the cross-linking of at least one chain polymer.

Among the most useful of the thermoplastic resins are those prepared by the polymerization of halo-mono-olefins, particularly those prepared from halo-olefins having a high degree of fluorine substitution. These resins, particularly when they contain fluorine substituents at at least half of the possible positions for substitution, have great chemical stability and are resistant to attack by many ordinarily corrosive substances. Among these resins, those containing disordered molecules have been found to have a higher degree of thermoplasticity and, in many cases, a high degree of elasticity, depending on the degree of disorder. Disorder in a chain polymer is often obtained by the copolymerization of different compounds with olefinic unsaturation, and for purposes of this invention, it is necessary that at least one of the co-monomer compounds should contain hydrogen.

For example, chlorotrifluoroethylene polymers have been developed to commercial success due to their unique combination of physical, chemical, and electrical properties. It has been found possible to modify some of these properties for greater utility in specific applications by the copolymerization of chlorotrifluoroethylene with hydrogen-containing mono-olefins and halo-mono-olefins, such as vinylidene fluoride. These copolymers still retain many of the valuable properties of chlorotrifluoroethylene homopolymers, and particularly retain, to a large degree, the property of chemical inertness.

It has been found that copolymers of chlorotrifluoroethylene and vinylidene fluoride containing up to about 5 mole percent of vinylidene fluoride are more thermoplastic than the homopolymer of chlorotrifluoroethylene and can, therefore, be molded easily into thin shapes which are difficult to mold with the homopolymer. Copolymers of chlorotrifluoroethylene and between 20 and 30 mole percent of vinylidene fluoride are soluble at ambient temperatures in oxygenated organic solvents, such as esters, ketones and cyclic ethers, and may be applied as coatings from such solutions. It has also been found that copolymers of chlorotrifluoroethylene and vinylidence fluoride containing from about 30 to 80 percent of vinylidene fluoride are elastomeric in nature and retain their elastomeric properties over a wide temperature range. All of these copolymers are chemically inert to a large degree.

Copolymers of this general type have been successfully vulcanized by heating them in the presence of an organic peroxy compound which is relatively stable at temperatures below about 50° C. and in the presence of a basic metal compound. Specifically, such chain saturated polymers have been successfully vulcanized in the presence of benzoyl peroxide and a metal oxide, such as zinc oxide. The vulcanizates of this type have moderate to good tensile strengths immediately after curing, of the order of from about 700 to 1700 p. s. i., depending upon the particular basic compound used. However, generally within a week after the vulcanization cure, the tensile strengths, particularly the higher tensile strengths, will drop considerably to a maximum of about 1200 p. s. i.

It is an object of this invention to improve the cross-linking of chain saturated polymers containing a high degree of halogen substitution, whose structure is composed substantially exclusively of carbon, hydrogen and halogen atoms.

It is a further object of this invention to improve the cross-linking of chain polymers prepared by the copolymerization of a halo-mono-olefin, containing a high degree of fluorine substitution, with a mono-olefinic compound, of the group consisting of olefins and halo-olefins containing hydrogen.

It is a further object of this invention to prepare vulcanizates of higher tensile strength than was heretofore possible, of chain saturated polymers having a high degree of halogen substitution, whose structure is compound substantially exclusively of carbon, hydrogen, and halogen atoms.

It is a further object of this invention to prepare stable vulcanizates whose tensile strength does not deteriorate appreciably with time, of chain saturated polymers having a high degree of halogen substitution, whose structure is composed substantially exclusively of carbon, hydrogen, and halogen atoms.

It is a further object of this invention to produce hard thermosetting vulcanizates of linear, saturated, hydrogen containing elastomers, containing a high degree of fluorine substitution.

It is a further object of this invention to reduce the solubility of linear, saturated, hydrogen containing elastomers, containing a high degree of fluorine substitution, produced by the copolymerization of at least two mono-olefinic compounds, at least one of which contains a high degree of halogen substitution, and at least one of which contains hydrogen.

It is a further object of this invention to produce tough, chemically inert coatings from solutions and dispersions of saturated, linear, hydrogen-containing elastomers, containing a high degree of fluorine substitution.

It is a further object of this invention to produce tough, chemically inert, self-supporting films from solutions and dispersions of saturated, linear, hydrogen containing elastomers, containing a high degree of fluorine substitution.

These and other objects are accomplished by the following invention:

Chain polymers, having a high degree of halogen substitution, whose structure is composed substantially exclusively of carbon, hydrogen, and halogen atoms, are reacted at elevated temperatures with an organic peroxy compound which is stable against the composition below about 50° C., with a basic metal compound, and with a compound other than said basic metal compound containing ionic lead, to produce a cross-linked polymer. It is preferred that the chain polymers be at least half fluorine substituted and that $-CH_2-$ groups be present. In other words, at least some of the carbon atoms on the chain should be bonded only to hydrogen atoms and other carbon atoms.

Chain polymers with a minor degree of disorder in their molecules are generally more thermoplastic in nature than those without such disorder. Elasticity requires a greater degree of disorder. In order to obtain an elastomeric product, at least 10 percent of the carbon atoms in the structure must be of the type which are bonded only to hydrogen atoms and other carbon atoms. Ordinarily, a mono-olefinic compound containing a $CH_2=$ group is used to provide these carbon atoms, and this results in chains containing $-CH_2-$ groups. Ordinarily, such a mono-olefinic compound is copolymerized with another mono-olefinic compound having a high degree of fluorine substitution to help give the polymer molecule its highly fluorine-substituted nature.

Among the halo-olefins having a high degree of fluorine substitution which may be used as co-monomers are:
$CF_2=CFCl$, $CF_2=CCl_2$, $CF_3-CF=CF_2$, $CF_2=CHCl$, $$CF_3-CCl=CCl-CF_3, \; CF_2=CHF$$

$CF_3-CH=CH-CF_3$ (cis or trans), $CF_2=CF_2$

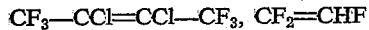
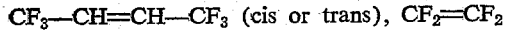
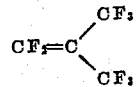

$CF_2=CFBr$, $CF_2=CCl-CF_3$, $CF_3-CH=CH_2$ and $CF_3-CCl=CCl_2$.

Among the hydrogen containing mono-olefins which may be used as co-monomers with the above halo-mono-olefins are: $CF_2=CH_2$, $CFH=CH_2$, $CH_2=CH_2$, $CFCl=CH_2$, $CCl_2=CH_2$, $CClH=CH_2$, $CHBr=CH_2$ and

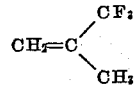

Of these, the most advantageous combinations are:

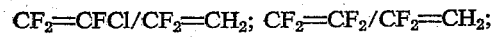

The aforementioned mono-olefinic compounds may be copolymerized in any proportions, depending on the characteristics desired. Good chemical stability requires fluorine substitution at at least one-half of the possible positions for such substitution in the polymer chain.

It is to be noted that all of the monomers enumerated above contain only carbon, hydrogen and halogen atoms and, therefore, produce copolymers substantially without markedly reactive functional groups. This, of course, does not preclude the presence of other atoms in end groups which might be formed by chain stoppers in the polymerization zone, present by design or by accident. Such end groups are relatively few in number and are difficult to detect. They do not, in any way, affect the characteristics of the polymer to any noticeable degree.

The copolymerization reaction may be carried out in either a water suspension type system or in a mass polymerization system. In the former system the reaction is preferably carried out at a temperature between about 0° C. and about 35° C. In a mass polymerization system the reaction is preferably carried out at a temperature between about $-20°$ C. and about 0° C. With the water suspension type system a redox catalyst system is preferred. It has and contains an oxidant, a reductant and a variable valence metal salt. The oxidant in the water suspension type recipe is preferably an inorganic persulfate, such as potassium persulfate, sodium persulfate or ammonium persulfate. The reductant is preferably a bisulfite, such as sodium bisulfite or potassium bisulfite. The variable valence metal salt which is employed for the purpose of regenerating the oxidant is preferably in the form of an iron salt, such as ferrous sulfate or ferrous nitrate with ferrous sulfate being the most desirable variable valence metal salt.

In the mass polymerization system, organic peroxide promoters, and particularly halogen-substituted acyl peroxides are used. Trichloroacetyl peroxide is a preferred promoter of this type. Other halogen-substituted organic peroxides suitable for carrying out the polymerization are trifluoroacetyl peroxide, difluoroacetyl peroxide, 2,4-dichlorobenzoyl peroxide, chloroacetyl peroxide, trifluorodichloropropionyl peroxide, and dichlorofluoroacetyl peroxide.

By the method of this invention these copolymers may be cross-linked to produce vulcanizates of increased strength and toughness, of decreased solubility, good extensibility, and thermosetting properties.

The organic peroxy compounds used in this invention must be stable below about 50° C., or else they will cause cross-linking while they are being blended into the copolymer. Among these compounds are the acyl and alkyl peroxides and hydroperoxides, such as dilauryl peroxide, dibenzoyl peroxide, p-chlorodibenzoyl peroxide, cyclohexanone hydroperoxide and ditertiary butyl hydroperoxide. The organic peroxy compounds also include peresters, such as alkyl and aryl perbenzoates and perphthalates, including specifically ditertiary butyl perbenzoate and ditertiary butyl diperphthalate. Peracids, such as tertiary butyl permaleic acid and perlauric acid, are also included.

Among the basic metal compounds which may be used, the preferred compounds are the basic oxides, such as magnesium oxide, calcium oxide, zinc oxide and lead oxide (PbO). Other basic metal compounds which may be used include both inorganic and organic metal compounds which are acid acceptors, such as magnesium carbonate, calcium carbonate, calcium acetate, tetraphenyl tin, tetraethyl lead, and sodium methylate. It is to be noted that compounds containing ionic lead, such as lead oxide, are not excluded from the category of basic metal compounds. However, in order to obtain the benefits of this invention, an additional compound containing ionic lead must be employed in the vulcanization process. Thus, two lead compounds, one designated as the basic metal compound, and the other designated as the compound containing ionic lead, must be used if the basic metal compound selected happens to be a compound containing ionic lead. Such a mixture is superior to an equivalent quantity of only one lead compound.

Among the compounds containing ionic lead which may be used are the lead oxides, the lead hydroxides, and the lead salts, including basic and acid salts. Among the specific compounds which may be used are lead sulfate, lead hydroxide ($Pb(OH)_2$), dibasic lead phosphite, tribasic lead sulfate, tribasic lead maleate, lead acetate, lead basic actate ($Pb_2OH(C_2H_3O_2)_3$), lead chloride ($PbCl_2$), lead chromate, lead fluosilicate ($PbSiF_6 \cdot 2H_2O$), lead laurate, lead oleate, lead molybdate, lead oxalate, lead orthophosphate ($Pb_3(PO_4)_2$), lead orthophosphite, lead metasilicate, and others.

Mixtures of two or more peroxy-type compounds, two or more basic metal compounds, or two or more compounds containing ionic lead may also be used.

In order to get good blending of the solid cross-linking agents with the elastomer, they must be subdivided to a relatively small particle size. Compounds having a maximum particle size of about 40 to 100 mesh are generally used. Larger particles may be ground to the desired size prior to addition to the elastomer. If desired, the basic metal compound and the compound containing ionic lead may be ground together, thereby simultaneously blending the compounds with each other. However, the preblending of the basic metal compound and the compound containing ionic lead is not required since the compounds are readily blended with each other during the blending with the elastomer.

The basic metal compound and the compound containing ionic lead may be combined as a single composite additive. A typical example of such an additive would be a leaded zinc oxide, available commercially as a paint ingredient. A typical composite of this type is available under the trademark "Ozlo 24R," containing 88% of zinc oxide and 12% of lead sulfate.

While it is not desired to be bound by any particular theory of operation, it is believed that the peroxy-type compounds remove a hydrogen atom from a carbon atom on the linear chain and thereby produce an activated free radical spot on the chain. This spot links directly to a similar free radical spot on another chain, and thus produces a cross-linked polymer. It is believed that the basic metal compound helps to remove the hydrogen atom and to neutralize it after removal, and thereby facilitates the cross-linking reaction. The function of the compound containing ionic lead in this mechanism is not understood, although its beneficial effect has been observed. The function of the compound containing ionic lead is apparently more complex than the mere addition of hydrogen accepting capacity, since it gives improved results over the mere addition of larger quantities of the basic metal compound.

The cross-linking reaction may require or may produce materials which have an adverse effect on the properties of the cross-linked polymer. For example, the metallic salts produced by the reaction of the inorganic basic metal compounds with the acidic hydrogen removed from the polymer chain, might reduce the chemical inertness and electrical resistance of the polymer. However, since relatively few cross-linkages are required to produce a substantial alteration in the characteristics of the polymer, relatively small amounts of cross-linking agents are required. In producing a cross-linked polymer for special purposes where a high degree of chemical inertness or electrical resistance is required, conditions may be controlled so that a minimum of undesired material remains in the polymer.

There are several methods of reacting the chain polymers with the cross-linking agent of this invention, depending on the character of the polymer, the character of the cross-linking agent and the character of the desired product. Cross-linking agents may be easily incorporated into the elastomers by mechanical mixing, either with or without plasticizers. Such mechanical mixing involves shearing forces and is carried out in equipment such as 2-roll mills, Banbury (internal) mixers and screw-type plasticators, which resemble extruders. Somewhat elevated temperatures of the order of from about 50° to about 75° C. ordinarily prevail in the mixing operation due to the mixing action itself. Articles to be molded are then heated in the mold with additional heat, as by hot air, steam or hot press platens, thereby shaping and cross-linking simultaneously. The temperature in the mold may range from about 100° C. to 200° C.

Since mechanical mixing generates heat and since it is difficult to blend other materials into a cross-linked polymer, it is usually desirable to blend other materials into the polymer first and then add the linking agents last, just before fabrication. Among the other materials which might be added to the aforesaid polymers prior to cross-linking are fillers, pigments and plasticizers.

With certain polymers and for certain uses, particularly for coatings, polymers may be cross-linked from solutions. The polymer and linking agents are blended together and then dissolved in a suitable solvent. When the basic metal compound is an insoluble compound, such as zinc oxide, or when the compound containing ionic lead is insoluble, such as lead oxide or lead sulfate, they remain suspended in the viscous solution. The solution is applied to a surface, such as a fabric or metal, and then the coating is dried and heated to cross-link the polymer. In some cases, the coating is adherent and in other cases it may be stripped off to form a self-supporting film of cross-linked polymer.

Still another method of cross-linking a chain polymer involves the use of a milky emulsion or "latex." As stated above, the copolymerization product of chlorotrifluoroethylene and vinylidene fluoride may be prepared in a water suspension type system. In such a system the product is removed from the reactors as a latex. For most purposes, the dry rubbery copolymer is recovered by coagulation of the latex with salts and acids followed by washing and drying. For other purposes, however, such as dip coating and spraying, the latex can be used directly. In these cases, the other ingredients (fillers, cross-linking agents, etc.) are dispersed in water containing a surface-active agent, and these dispersions are blended with the latex. The latex is then applied as a coating to a surface (similar to the solutions disclosed above) and the polymer is cross-linked as the latex is dried and heated.

Another method of reacting the chain polymer with the peroxide cross-linking agent, the basic metal compound and the compound containing ionic lead, involves the reaction of the linking agents with the polymer in its finished, fabricated state. Since this method involves the penetration of the polymer by the reactant compounds, it is adaptable primarily to very thin sections of polymer, such as in coatings or in unsupported films. The coating or film is maintained in contact with a mixture of the peroxy compound, the basic metal compound and the compound containing ionic lead, at elevated temperatures and preferably under pressure, for a period of time ranging from a few seconds to several days. This results in the changing of the characteristics of the chain polymer to those of a space polymer.

The proportions of peroxy compound, basic metal compound and the compound containing ionic lead used in the cross-linking of the polymers of high fluorine content of this invention will vary with the nature of the polymer, the nature of the peroxy-type compound, the nature of the basic metal compound, the nature of the compound containing ionic lead, the method, time and temperature of curing and the degree of cross-linking desired. In general, for each 100 parts by weight of polymer of high fluorine content, the weight of peroxy compound will vary from about 0.5 to about 5 parts by weight. The amount of basic metal compound will vary from about 1 to about 30 parts by weight. The amount of the compound containing ionic lead will vary from about 1 to about 20 parts by weight.

The temperature and time of curing will also vary with the nature of the polymer to be cured, the nature of the peroxy compound, the basic metal compound, the compound containing ionic lead and the degree of cross-linking desired. In general, the temperature of curing may vary from about 75° C. to about 200° C. The time of curing may vary from about 5 minutes to about 16 hours.

Example I 100 parts by weight of an equimolar chlorotrifluoroethylene-vinylidene fluoride copolymer were banded on a cooled mill. A mixture of 10 parts by weight of zinc oxide and 10 parts by weight of dibasic lead phosphite was then added and blended into the rubbery copolymer. 3 parts by weight of benzoyl peroxide (90%) was ground to a fine powder and dispersed into the rubbery matrix on the mill. The blend was then milled thoroughly and sheeted for pressing. A sheet of this blend was press cured in a standard rubber mold measuring 6″ square by 0.078″ deep at 200 pounds per square inch and 230° F. for one-half hour. The press cured sheet was then cured in an oven at 300° F. for 16 hours. The cured sheet was white in color and had smooth texture with a glossy surface. It was completely free of bubbles or flow lines. Tests of this blend immediately after curing and after a period of three weeks showed the following results:

|  | Original | Aged 3 weeks |
|---|---|---|
| Tensile strength (p. s. i.) | 2,650 | 2,600 |
| Percent elongation | 500 | 475 |

Example II

For comparison purposes, a similar blend which lacks the dibasic lead phosphite was prepared. The copolymer was similar to that of Example I and was blended with 10 parts by weight of zinc oxide and 3 parts by weight of benzoyl peroxide, and then press cured and oven cured in accordance with the above procedure. The results were as follows:

|  | Original | Aged 1 week |
|---|---|---|
| Tensile strength (p. s. i.) | 1,350 | 940 |
| Percent elongation | 500 | 525 |

Examples III to IX

In these examples, a copolymer elastomer which was an equimolar copolymer of chlorotrifluoroethylene and vinylidene fluoride was blended in a rubber mill by the same procedure as in Example I, with the ingredients shown below. The blends were cured in the same manner as the blend of Example I, to give tensile strengths and elongations as shown below:

| Example No. | III | IV | V | VI | VII | VIII | IX |
|---|---|---|---|---|---|---|---|
| Elastomer | 100 | 100 | 100 | 100 | 100 | 100 | 100 |
| ZnO | 10 |  | 10 | 10 | 10 | 10 |  |
| PbO |  | 10 |  |  | 6.6 |  |  |
| PbSO$_4$ |  |  | 10 |  | 3.3 |  |  |
| Pb(OH)$_2$ |  |  |  | 10 |  |  |  |
| Tribasic lead sulfate |  |  |  |  |  | 10 |  |
| Leaded zinc oxide [1] |  |  |  |  |  |  | 20 |
| Benzoyl peroxide | 3 | 3 | 3 | 3 | 3 | 3 | 3 |
| Physical properties: |  |  |  |  |  |  |  |
| Tensile strength, p. s. i. | 1,200 | 1,150 | 1,500 | 1,520 | 1,880 | 1,850 | 1,940 |
| Percent elongation | 500 | 780 | 500 | 650 | 610 | 560 | 430 |

[1] Leaded zinc oxide is a commercially available composite analyzing as substantially 88% of zinc oxide and 12% of lead sulfate.

Examples X to XVI

In these examples, the copolymers were blended in accordance with the recipes shown below, following the blending and curing procedure of Example I. In Examples X to XV, the copolymer was equimolar, and in Example XVI the copolymer contained approximately 30 mol percent of chlorotrifluoroethylene and 70 mol percent of vinylidene fluoride.

| Example No. | X | XI | XII | XIII | XIV | XV | XVI |
|---|---|---|---|---|---|---|---|
| Copolymer | 100 | 100 | 100 | 100 | 100 | 100 | 100 |
| Benzoyl peroxide | 3 | 3 | 3 | 3 | 3 | 3 | 3 |
| ZnO |  | 10 |  | 10 |  |  | 10 |
| PbO | 10 |  |  | 30 |  |  |  |
| MgO |  |  |  |  |  | 10 |  |
| CaO |  |  | 10 |  | 10 | 10 |  |
| Tribasic lead sulfate |  |  |  |  |  |  | 10 |
| Dibasic lead phosphite | 10 | 10 | 10 | 10 |  |  |  |
| Tensile strength, p. s. i. | 1,620 | 2,650 | 2,180 | 1,980 | 2,120 | 2,180 | 2,540 |
| Percent elongation | 575 | 500 | 475 | 700 | 500 | 420 | 450 |

Examples XVII and XVIII

In these examples, a comparison was made between cross-linking with a combination of a basic metal compound and a compound containing ionic lead, and cross-linking with an increased amount of the basic metal compound alone. The copolymers were equimolar polymers of chlorotrifluoroethylene and vinylidene fluoride, and were blended and cured following the procedure of Example I.

| Example No. | XVII | XVIII |
|---|---|---|
| Copolymer | 100 | 100 |
| Benzoyl peroxide | 3 | 3 |
| ZnO | 20 | 10 |
| Dibasic lead phosphite |  | 10 |
| Tensile strength, p. s. i. | 1,615 | 2,322 |
| Percent elongation | 375 | 375 |

We claim:

1. A method of cross-linking a chain saturated aliphatic polymer composed substantially exclusively of carbon, hydrogen and halogen atoms, containing fluorine substituents at at least half of the possible positions for such substituents, and having at least 10% of the carbon atoms in the chain bonded solely to hydrogen atoms and other carbon chains, which comprises heating said polymer to a temperature from about 75° C. to about 200° C. in the presence of an organic peroxy compound which is stable at temperatures below about 50° C. in the presence of a basic metal compound and in the presence of a compound containing ionic lead other than said basic metal compound.

2. The method of claim 1, wherein the chain saturated polymer contains —$CH_2$— groups.

3. The method of claim 1, wherein the chain saturated polymer is a copolymer of chlorotrifluoroethylene and vinylidene fluoride.

4. The method of claim 1, wherein said polymer is heated in the presence of an organic peroxide.

5. The method of claim 4, wherein the chain saturated polymer contains —$CH_2$— groups.

6. The method of claim 4, wherein the chain saturated polymer is a copolymer of chlorotrifluoroethylene and vinylidene fluoride.

7. A method of vulcanizing a chain saturated copolymer of chlorotrifluoroethylene and vinylidene fluoride, having at least 10% of the carbon atoms in —$CH_2$— groups, which comprises heating said polymer to a temperature from about 75° C. to about 200° C. in the presence of benzoyl peroxide, a basic metal compound and a compound containing an ionic lead other than said basic metal compound.

8. The method of claim 7, wherein said basic metal compound is zinc oxide.

9. The method of claim 7, wherein said basic metal compound is lead oxide (PbO).

10. The method of claim 7, wherein said basic metal compound is magnesium oxide.

11. The method of claim 7, wherein said compound containing ionic lead is tribasic lead sulfate.

12. The method of claim 7, wherein said compound containing ionic lead is dibasic lead phosphite.

13. The method of claim 7, wherein said compound containing ionic lead is tribasic lead maleate.

14. The method of claim 7, wherein said compound containing ionic lead is lead sulfate.

15. The method of claim 7, wherein said compound containing ionic lead is lead hydroxide.

16. A method of vulcanizing a chain saturated copolymer of chlorotrifluoroethylene and vinylidene fluoride having at least 10% of the carbon atoms in $-CH_2-$ groups, which comprises blending 100 parts of said copolymer with 0.5 to 5 parts by weight of a peroxy compound, 1 to 30 parts by weight of a basic metal compound, and 1 to 20 parts by weight of a compound containing ionic lead other than said basic metal compound, and heating said blend to a temperature from about 75° C. to about 200° C. for a period between about 5 minutes to about 16 hours.

References Cited in the file of this patent

UNITED STATES PATENTS 2,628,214     Pinkney et al. _____ Feb. 10, 1953